United States Patent
Fuke et al.

(10) Patent No.: US 7,349,372 B2
(45) Date of Patent: Mar. 25, 2008

(54) PACKET CONTROL APPARATUS TO CONNECT INTERCONNECTED NETWORK AND WIRELESS APPARATUS

(75) Inventors: Naoki Fuke, Saitama (JP); Keizo Sugiyama, Saitama (JP); Hideyuki Shinonaga, Saitama (JP)

(73) Assignee: KDDI Corporation, Tokyo (JP)

( * ) Notice: Subject to any disclaimer, the term of this patent is extended or adjusted under 35 U.S.C. 154(b) by 778 days.

(21) Appl. No.: 10/637,503

(22) Filed: Aug. 11, 2003

(65) Prior Publication Data

US 2004/0136347 A1    Jul. 15, 2004

(30) Foreign Application Priority Data

Aug. 21, 2002    (JP)    ............................. 2002-240474

(51) Int. Cl.
*H04Q 7/00* (2006.01)
(52) U.S. Cl. .................................. 370/329; 370/395.52
(58) Field of Classification Search ................ 370/329, 370/428, 218–219, 225, 228, 395.52; 455/63.3, 455/63.1
See application file for complete search history.

(56) References Cited

U.S. PATENT DOCUMENTS

| | | | | |
|---|---|---|---|---|
| 5,473,599 A | * | 12/1995 | Li et al. | 370/219 |
| 6,195,705 B1 | * | 2/2001 | Leung | 709/245 |
| 2003/0198221 A1 | * | 10/2003 | Kim et al. | 370/389 |

* cited by examiner

*Primary Examiner*—Nguyen T. Vo
(74) *Attorney, Agent, or Firm*—Oblon, Spivak, McClelland, Maier & Neustadt, P.C.

(57) ABSTRACT

A packet control apparatus connected between an interconnected network and a wireless apparatus includes a quality detection unit for detecting whether a quality of transmission toward the wireless apparatus is in a predetermined deteriorated state, and a packet filtering unit for deleting a link state watching packet received from the interconnected network, when the transmission quality is in the predetermined deteriorated state.

6 Claims, 4 Drawing Sheets

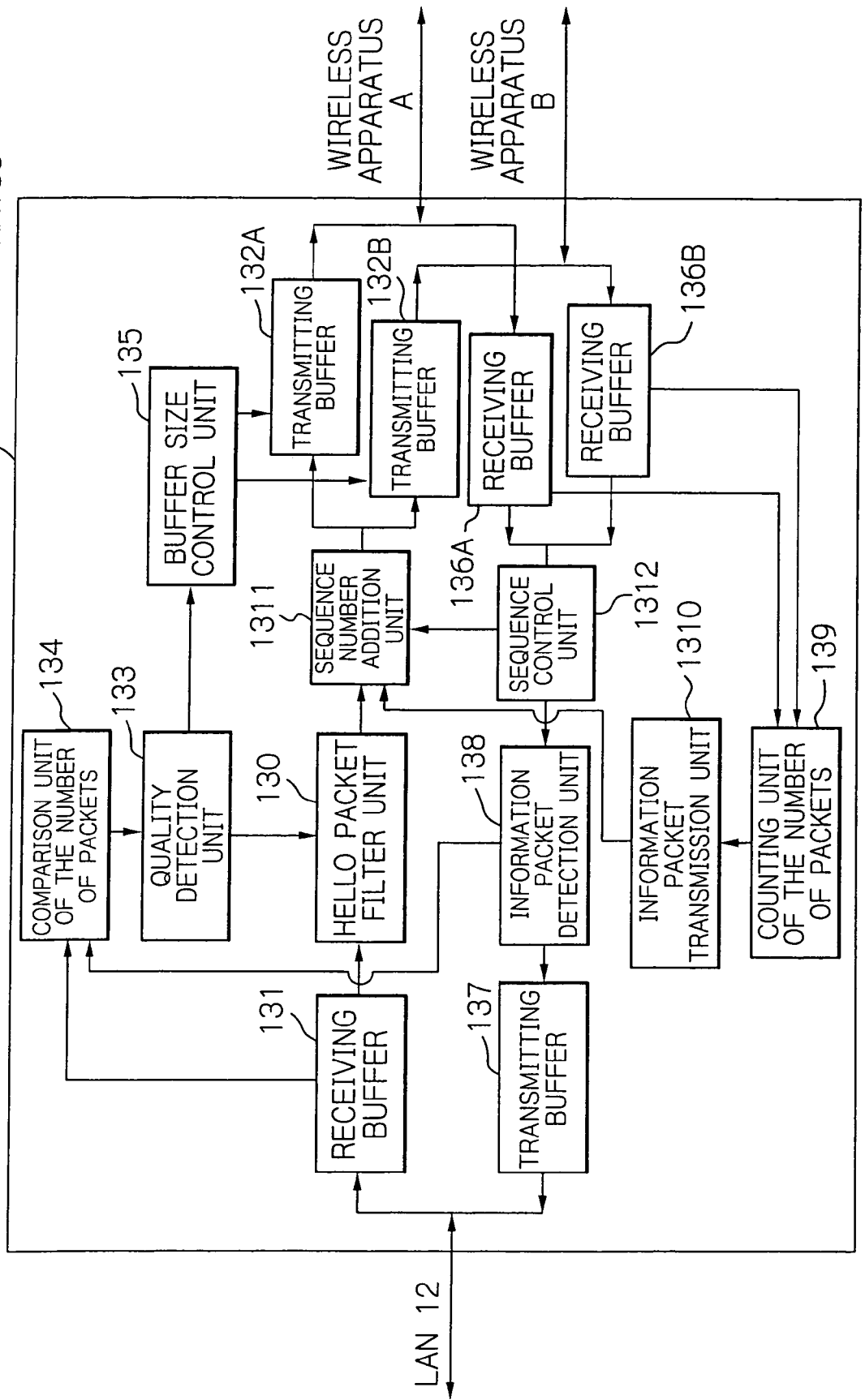

PACKET CONTROL APPARATUS TO CONNECT INTERCONNECTED NETWORK AND WIRELESS APPARATUS

FIELD OF THE INVENTION

The present invention relates to a packet control apparatus connected between an interconnected network such as the Internet and a wireless apparatus. In particular, the present invention relates to a packet control apparatus provided in a cable and radio network that transmits and receives packets of Internet Protocol, for controlling the transmitting and received packets to improve the transmission quality.

DESCRIPTION OF THE RELATED ART

There is a cable and radio network connected through a plurality of radio channels between routers provided in LANs. Since such combined network of cable and radio channels can maintain the communication by using another channel when one channel malfunctions, the transmission quality in the whole network can be improved.

A router is in general designed to transmit packets received by one channel to another channel. According to OSPF (Open Shortest Path First) of a representative route control protocol, a state in the network is detected by transmitting and receiving a link state watching packet ("hello" packet) between the routers at a predetermined time interval such as a standard value of 10 seconds. When no "hello" packet is arrived at the router, it is judged that malfunction may occur in the current channel and thus the router will change the route from the malfunctioned channel to a normal channel.

However, since the OSPF is the protocol designed for a wired network, problems may occur in case that the OSPF is applied to a wireless network.

Although a radio channel is susceptible to weather conditions such as fog and rain, the communication through the radio channel is gradually influenced in response to gradual change in the weather conditions. Thus, when the weather conditions begin to get worse, loss of long packets used for the user data will start due to deterioration of the transmission quality, while short packet used for the "hello" packet may arrive at the wireless apparatus on the other side without loss. In such state, although the long packets of the user data have been lost, the router will judge that the channel is normal. Then, when the transmission quality deteriorates to lose the short packets, the route control by OSPF will start.

Although 2.4 GHz band radio channel is not susceptible to the weather conditions, the similar problems mentioned above may occur when a plurality of wireless apparatuses operate at the same frequency band or the radio channel is interfered from other wireless systems.

As aforementioned, according to the conventional method, it was impossible to immediately change a route on the wireless network to a normal channel when the transmission quality thereof deteriorates and thus the channel with poor transmission quality might to be used.

SUMMARY OF THE INVENTION

It is therefore an object of the present invention to provide a packet control apparatus connected between an interconnected network and a wireless apparatus, whereby a route can be changed without delay when the transmission quality of a radio channel becomes poor to lose long packets of user data.

According to the present invention, particularly, a packet control apparatus is connected between an interconnected network and a wireless apparatus. The packet control apparatus includes a quality detection unit for detecting whether a quality of transmission toward the wireless apparatus is in a predetermined deteriorated state, and a packet filtering unit for deleting a link state watching packet received from the interconnected network when the transmission quality is in the predetermined deteriorated state.

In the preferred embodiment of the present invention, the link state watching packet is a "hello" packet in Open Shortest Path First route control protocol.

In the preferred embodiment of the present invention, the packet control apparatus further includes an information packet transmitting unit for transmitting a short packet that includes information of the number of packets received from the wireless apparatus, to the wireless apparatus, and a comparison unit for comparing the number of packets to be transmitted to the wireless apparatus with the number of received packets, which information is included in the short packet received from the wireless apparatus, and for outputting a message representing the deteriorated state to the quality detecting unit.

In the preferred embodiment of the present invention, the packet control apparatus further included a buffer size control unit for increasing a size of a transmitting buffer that stores the packets to be transmitted to the wireless apparatus, when a message representing the deteriorated state is received from the quality detecting unit.

In the preferred embodiment of the present invention, a plurality of wireless apparatuses are provided for a plurality of radio channels connected between the packet control apparatus and an opposite packet control apparatus on the other side, and the packet control apparatus further includes a sequence number addition unit for adding a sequence number to a packet to be transmitted to the wireless apparatuses, and for simultaneously inputting the packet into a plurality of transmitting buffers corresponding to the respective wireless apparatuses, and a sequence control unit for checking the sequence number of the packet received from the plurality of wireless apparatuses, for arranging a sequence of the packets, and for deleting one of duplicate packets.

In the preferred embodiment of the present invention, a modulo-N in the sequence number managed by the sequence number addition unit and the sequence control unit is smaller than the maximum sequence number in protocol.

BRIEF DESCRIPTION OF THE DRAWINGS

FIG. 4 illustrates a function configuration of a packet control apparatus shown in FIG. 3.

DESCRIPTION OF THE PREFERRED EMBODIMENTS

Figure 1:
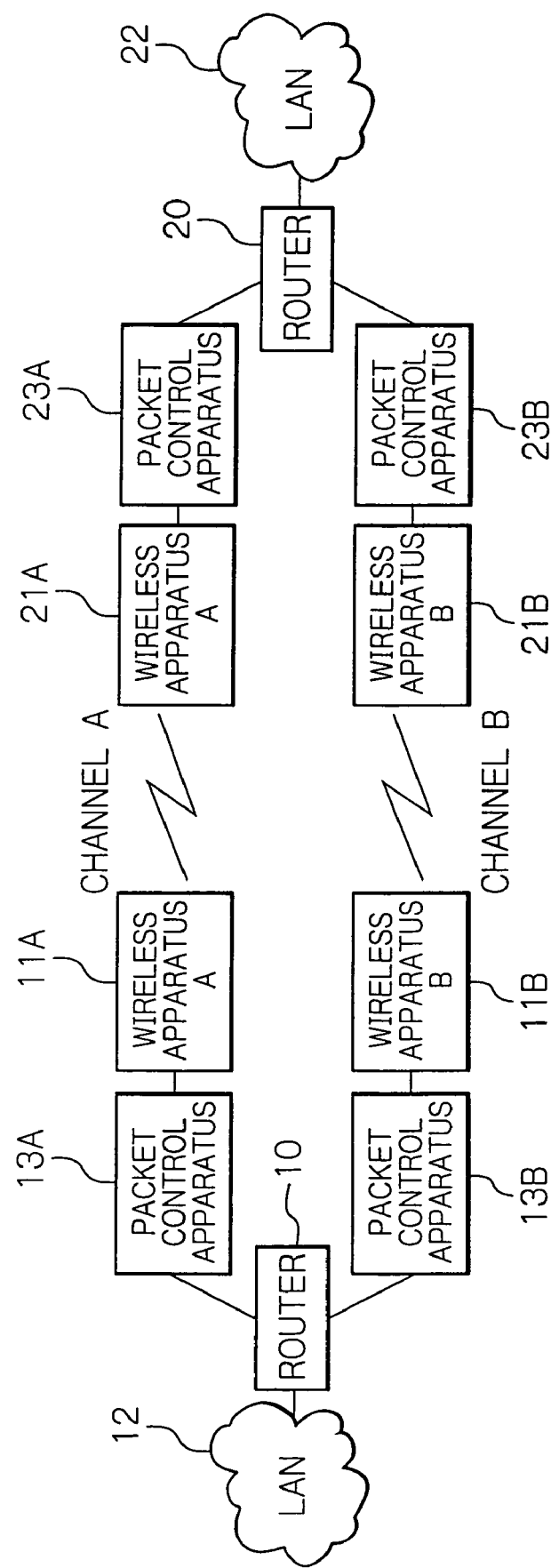
FIG. 1 illustrates a configuration of a communication system with packet control apparatuses in a preferred embodiment according to the present invention.

As shown in FIG. 1, the communication system of this embodiment has a network connected, by means of two parallel radio channels, between a router 10 provided in LAN 12 and a router 20 provided in LAN 22. These parallel radio channels are a radio channel A connected between wireless apparatuses 11A and 21A and a radio channel B connected between wireless apparatuses 11B and 21B. Each packet control apparatus is provided between each wireless apparatus and the router.

One side of the packet control apparatus 13A for transmitting and receiving packets through the radio channel A is connected to the router 10 in LAN 12, and the other side thereof is connected to the wireless apparatus 11A. One side of the packet control apparatus 23A which is an opposite packet control apparatus of the apparatus 13A is connected to the router 20 in LAN 22, and the other side thereof is connected to the wireless apparatus 21A. One side of the packet control apparatus 13B for transmitting and receiving the packets through the radio channel B is connected to the router 10 in LAN 12, and the other side thereof is connected to the wireless apparatus 11B. One side of the packet control apparatus 23B which is an opposite packet control apparatus of the apparatus 13B is connected to the router 20 in LAN 22, and the other side thereof is connected to the wireless apparatus 21B.

Figure 2:
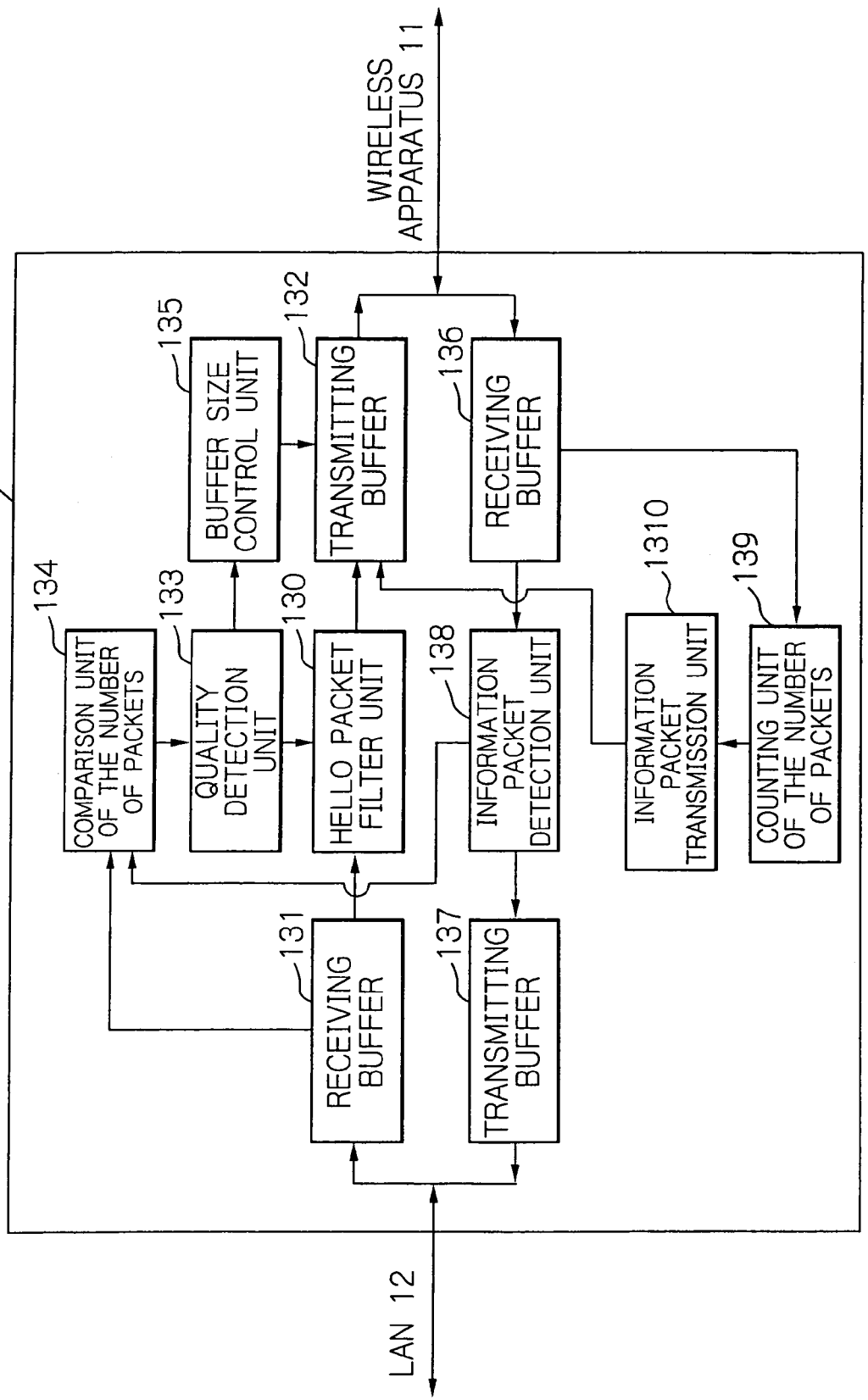
FIG. 2 illustrates a function configuration of the packet control apparatus shown in FIG. 1.

FIG. 2 illustrates a function configuration of the packet control apparatus 13 (13A or 13B) shown in FIG. 1. Hereinafter, configuration and operations of the packet control apparatus by using this figure.

As shown in FIG. 2, packets from the router 10 in LAN 12 are transmitted to the wireless apparatus 11 through a receiving buffer 131, a hello packet filter unit 130 and a transmitting buffer 132. On the other hand, packets from the wireless apparatus 11 are transmitted to the router 10 in LAN 12 through a receiving buffer 136, an information packet detection unit 138 and a transmitting buffer 137. In order to control a filtering of a "hello" packet, the packet control apparatus 13 (13A or 13B) additionally has a comparison unit 134 for comparing the number of transmitted packets with the number of received packets, a quality detection unit 133 for detecting deterioration in transmission quality, and a buffer size control unit 135. Also, in order to transmit the number of received packets to the opposite packet control apparatus (23A or 23B), the packet control apparatus 13 (13A or 13B) has a counting unit 139 for counting the number of the received packets, and an information packet transmission unit 1310 for transmitting the short packet including the number of received packets.

The receiving buffer 131 receives packets from the router 10 in LAN 12, and sends the received packets to the hello packet filter unit 130 and to the comparison unit 134.

The comparison unit 134 counts the number of packets received from the receiving buffer 131 for every predetermined time. At this time, the comparison unit 134 counts the number of short packets (100 bytes or less) and the number of long packets (1000 bytes or more), respectively. A time stamp is added to the information of the number of received packets. The number of received packets counted is compared with the number of normal received packets on the same time stamp outputted from the information packet detection unit 138, and a packet loss ratio is calculated. Then, the calculated ratio is outputted to the quality detection unit 133.

When the calculated packet loss ratio from the comparison unit 134 indicates inferior quality with respect to a predetermined condition, the quality detection unit 133 judges that the transmission quality is in the deteriorated state. Then, the quality detection unit 133 sends a message of the judged result to the hello packet filter unit 130 and to the buffer size control unit 135. The above-mentioned predetermined condition is a predetermined threshold value of the packet loss ratio. When the packet loss ratio is larger than the threshold value, it is judged that the radio channel is in the deteriorated state in transmission quality. Then, the packet control apparatus 13 (13A or 13B) will transmit a short packet representing the deteriorated state to the opposite packet control apparatus (23A or 23B). This is because the short packet is hardly influenced from the transmission quality as compared with the long packet.

The hello packet filter unit 130 sends the packets from the receiving buffer 131 to the transmitting buffer 132. If the filter unit 130 has already received the message representing the deteriorated state from the quality detection unit 133, the filter unit 130 deletes only the "hello" packet in the packets from the receiving buffer 131. The remaining packets are sent to the transmitting buffer 132.

Thus, no "hello" packet will flow through the radio channel under the deteriorated state in transmission quality. Then, the router can detect possible malfunction of the radio channel to change the route. The router cannot change the route immediately after the detection of the deteriorated state in transmission quality. The transmitting interval time (10 seconds) of the "hello" packet is delayed at the maximum. Thus, all packets to be transmitted during the delayed time between the detection of the deteriorated and the change of the route, the packet loss ratio can be made into the minimum.

Of course, information packets including information of the number of received packets are exchanged even during the deteriorated state in transmission quality. Therefore, it is possible to judge that the transmission quality is recovered to the normal state when the packet loss ratio becomes smaller than the threshold value. Then, the quality detection unit 133 sends a message representing the normal state in transmission quality to the hello packet filter unit 130, so that this hello packet filter unit 130 stops filtering operation for deleting the "hello" packet. Thereby, the "hello" packet of the route control protocol can be normally transmitted to the radio channel.

The transmitting buffer 132 transmits the packets from the hello packet filter unit 130, to the wireless apparatus 11.

When the buffer size control unit 135 receives a message representing the deteriorated state in transmission quality from the quality detection unit 133, this unit 135 sends instructions to increase a size of a transmission buffer to the transmitting buffer 132. Thus, the size of the transmission buffer is increased so that the amount of packets capable of re-transmitting when the transmission quality is recovered is increased, resulting in the packet loss to decrease. This is because a duration of the deteriorated state of the radio channel is relatively short.

The receiving buffer 136 receives packets from the wireless apparatus 11, and sends the received packets to the information packet detection unit 138 and to the counting unit 139.

The counting unit 139 counts the number of packets normally received for every predetermined time, and outputs a message representing the number of the received packets to the information packet transmission unit 1310. At this time, the counting unit 139 counts the number of short packet and the number of long packet respectively as well as the aforementioned counting operation in the comparison unit 134.

The information packet transmission unit 1310 sends an information packet with the counted number of received packets in Ethernet frame to the transmitting buffer 132. A time stamp is added to this information packet. The transmitting buffer 132 sends the information packet to the opposite packet control apparatus located at the other side through the wireless apparatus 11. Timers of both the packet control apparatuses are synchronized with each other before starting of the counting operation so that times of the counting operations of the number of received packets are coincident with each other.

The information packet detection unit 138 extracts information of the number of received packets from the information packet sent from the opposite packet control apparatus located at the other side. Then, the unit 138 sends the extracted number of received packets to the comparison unit 134. The remaining packets are transmitted to the transmitting buffer 137. It is desired that the information packets are re-transmitted between the packet control apparatus and the opposite packet control apparatus so that the information packets are arrived at the other side with a high probability.

The transmitting buffer 137 transmits the packets from the information packet detection unit 138 to the router 10 in LAN 12.

Figure 3:
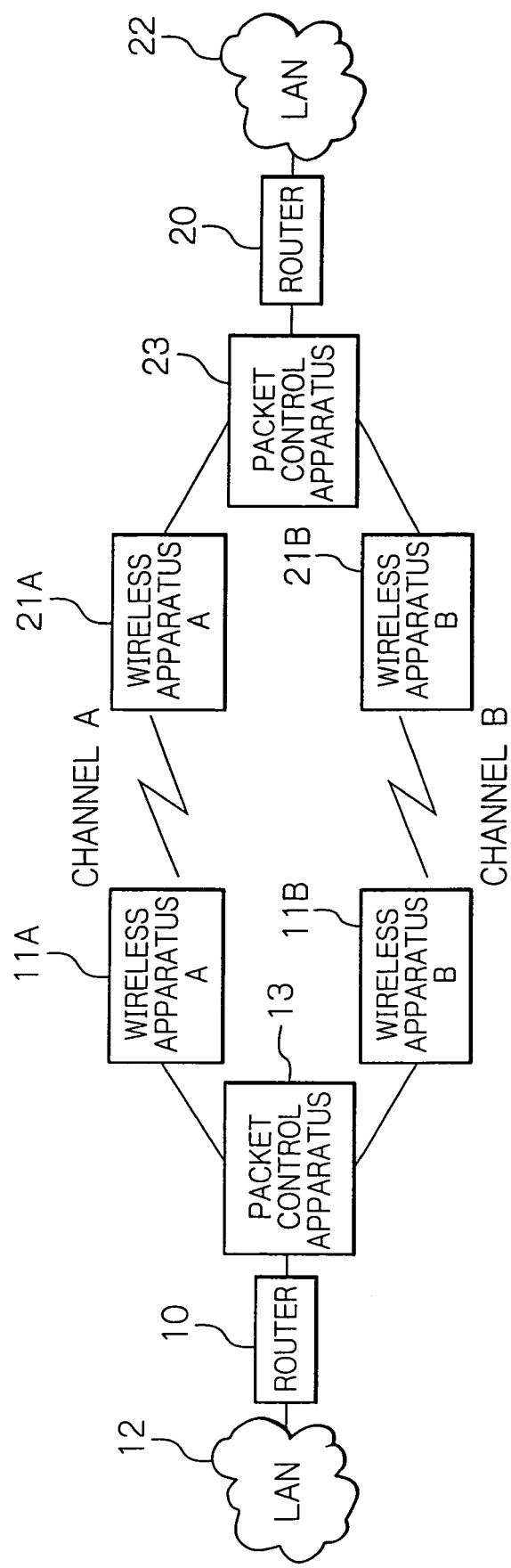
FIG. 3 illustrates a configuration of a communication system in another embodiment according to the present invention.

FIG. 3 illustrates a configuration of a communication system in another embodiment according the present invention, and FIG. 4 illustrates a function configuration of a packet control apparatus in the system.

In this embodiment, as shown in FIG. 3, two radio channels do not branch from the router 10 as the embodiment of FIG. 1, but branch from the packet control apparatus 13 connected to the router 10. As well as that in the embodiment of FIG. 1, this embodiment of FIG. 3 has LAN 12 and LAN 22 connected through a network with the two parallel radio channels.

As shown in FIG. 4, the configuration of this packet control apparatus is the same as that of the packet control apparatus shown in FIG. 2 except that the former has a sequence number addition unit 1311 and a sequence control unit 1312.

The sequence number addition unit 1311 adds a sequence number to the header in the packet received from the hello packet filter unit 130. Then, the packet is applied to two transmitting buffers 132A and 132B, and the branched packets are transmitted through different wireless apparatuses and different radio channels, respectively.

The opposite packet control apparatus located at the other side receives the similar packets from a plurality of radio channels.

The packets received by two receiving buffers 136A and 136B are applied to the sequence control unit 1312. This sequence control unit 1312 stores the sequence number of the packet outputted to the information packet detection unit 138, and compares the stored number with the sequence number of the received packet. By this comparison;

(A) If the sequence number of the received packet meets the sequence number of the packet already outputted to the information packet detection unit 138, the packet is deleted, and (B) If the sequence number of the received packet is a sequence number of the packet not yet outputted to the information packet detection unit 138, the packet is applied to the information packet detection unit 138.

Since the sequence number consists of a modulo-N, a packet with the same sequence number may be deleted although it will become a different packet when the number takes a round. For this reason, the sequence number addition unit 1311 and the sequence control unit 1312 can prevent an erroneous packet deletion that may occur due to setting of the modulo-N smaller than the maximum sequence number in the protocol.

As mentioned in detail above, according to the packet control apparatus of the present invention, when transmission quality of a radio channel deteriorates to lose long packets of user data, a link state watching packet or "hello" packet in the route control protocol is deleted. Thereby, a router can immediately detect the malfunctions, and thus the route control protocol can effectively operate and thus the route will immediately change.

Furthermore, according to the present invention, the number of packets is separately counted for long packet and short packet. Thereby, it is possible to immediately detect the state where the link state watching packet of short packet is transmitted normally but the user data of long packet is not transmitted.

Many widely different embodiments of the present invention may be constructed without departing from the spirit and scope of the present invention. It should be understood that the present invention is not limited to the specific embodiments described in the specification, except as defined in the appended claims.

What is claimed is:

1. A packet control apparatus connected between an interconnected network and a wireless apparatus, said packet control apparatus comprising:
    a quality detection means for detecting whether a quality of transmission toward said wireless apparatus is in a predetermined deteriorated state; and
    a packet filtering means for deleting a link state watching packet received from said interconnected network when the transmission quality is in said predetermined deteriorated state.

2. The apparatus as claimed in claim 1, wherein said link state watching packet is a hello packet in Open Shortest Path First route control protocol.

3. The apparatus as claimed in claim 1, wherein said packet control apparatus further comprises:
    an information packet transmitting means for transmitting a short packet that includes information of an amount of packets received from said wireless apparatus, to said wireless apparatus; and
    a comparison means for comparing an amount of packets to be transmitted to said wireless apparatus with the amount of received packets, which information is included in a short packet received from said wireless apparatus, and for outputting a message representing the deteriorated state to said quality detecting means.

4. The apparatus as claimed in claim 1, wherein said packet control apparatus further comprises:
    a buffer size control means for increasing a size of a transmitting buffer that stores packets to be transmitted to said wireless apparatus, when a message representing the deteriorated state is received from said quality detecting means.

5. The apparatus as claimed in claim 1, wherein a plurality of wireless apparatuses are provided for a plurality of radio channels connected between said packet control apparatus and an opposite packet control apparatus on another side, and wherein said packet control apparatus further comprises:
    a sequence number addition means for adding a sequence number to a packet to be transmitted to the wireless apparatuses, and for simultaneously inputting the packet into a plurality of transmitting buffers corresponding to the respective wireless apparatuses; and
    a sequence control means for checking the sequence number of the packet received from the plurality of wireless apparatuses, for arranging a sequence of packets, and for deleting one of duplication packets.

6. The apparatus as claimed in claim 5, wherein a modulo-N in the sequence number managed by said sequence number addition means and said sequence control means is smaller than a maximum sequence number in protocol.

* * * * *